(12) United States Patent
Rosberg et al.

(10) Patent No.: US 9,019,576 B2
(45) Date of Patent: Apr. 28, 2015

(54) SCANNING APPARATUS WITH PATTERNED PROBE LIGHT

(71) Applicant: 3Shape A/S, Copenhagen K (DK)

(72) Inventors: Christian Romer Rosberg, Copenhagen V (DK); Bo Esbech, Copenhagen Ø (DK)

(73) Assignee: 3Shape A/S, Copenhagen K (DK)

( * ) Notice: Subject to any disclaimer, the term of this patent is extended or adjusted under 35 U.S.C. 154(b) by 0 days.

(21) Appl. No.: 14/310,248

(22) Filed: Jun. 20, 2014

(65) Prior Publication Data

US 2014/0376064 A1     Dec. 25, 2014

(30) Foreign Application Priority Data

Jun. 21, 2013 (DK) ................................. 2013 70344

(51) Int. Cl.
| | | |
|---|---|---|
| *H04N 1/04* | (2006.01) | |
| *H04N 1/029* | (2006.01) | |
| *H04N 1/00* | (2006.01) | |
| *G01B 11/25* | (2006.01) | |

(52) U.S. Cl.
CPC ........... *H04N 1/029* (2013.01); *H04N 1/00827* (2013.01); *G01B 11/2513* (2013.01); *G01B 11/2527* (2013.01)

(58) Field of Classification Search
CPC .......... H04N 13/0203; H04N 13/0253; H04N 13/0275; H04N 13/0246; H04N 13/025; H04N 1/00827; H04N 5/2256; H04N 5/265; H04N 5/3532; H04N 5/374; H04N 9/045

USPC .......... 382/128, 131, 275; 348/46, 36, 40, 47, 348/68, 79; 435/287.2, 14, 252.33, 320.1, 435/6.12; 358/475, 509, 474, 482, 483
See application file for complete search history.

(56) References Cited

U.S. PATENT DOCUMENTS

| | | | |
|---|---|---|---|
| 4,837,732 | A | 6/1989 | Brandestini et al. |
| 7,256,899 | B1 * | 8/2007 | Faul et al. ...................... 356/623 |
| 7,756,327 | B2 * | 7/2010 | Komiya et al. ................ 382/162 |
| 8,085,295 | B2 * | 12/2011 | Tobiason et al. ................. 348/79 |
| 8,120,606 | B2 * | 2/2012 | Nakamura et al. ............. 345/419 |
| 8,780,176 | B2 * | 7/2014 | Yelin ................................ 348/45 |
| 2002/0018219 | A1 | 2/2002 | Hallerman et al. |
| 2010/0066823 | A1 | 3/2010 | Westphal et al. |
| 2010/0099984 | A1 | 4/2010 | Graser |
| 2010/0253773 | A1 | 10/2010 | Oota et al. |
| 2011/0063421 | A1 * | 3/2011 | Kubota ........................... 348/52 |
| 2012/0300039 | A1 | 11/2012 | Maison et al. |
| 2013/0027520 | A1 * | 1/2013 | Ono et al. ........................ 348/46 |

OTHER PUBLICATIONS

European Search Report issued in corresponding European Patent Application No. 14173233.9-1558/2840353, dated Jan. 28, 2015.

* cited by examiner

*Primary Examiner* — Negussie Worku
(74) *Attorney, Agent, or Firm* — Buchanan Ingersoll & Rooney PC

(57) ABSTRACT

A 3D scanner for recording the 3D topography of an object, the 3D scanner includes an illumination unit configured for providing probe light for illuminating the object, where the probe light includes a pattern of light rays; an image sensor for acquiring one or more 2D images of light rays returning from the illuminated object; an optical system including an optical element arranged such that the patterned probe light passes through it when propagating towards the object from the illumination unit along an optical path; and a device for changing the configuration of the optical system between a first and a second configuration, where the change in configuration comprises a change in orientation of the optical element between a first orientation and a second orientation relative to the optical path of the probe light.

18 Claims, 11 Drawing Sheets

100A

PRIOR ART

100B

960

```
┌─────────────────────────────────────┐
│ Acquiring a first set of 2D images  │
│ of light returning from the object  │
│ while illuminating the object with  │
│ patterned probe light from the      │     962
│ scanner with the optical system is  │
│ in said first configuration         │
└─────────────────────────────────────┘
                  │
                  ▼
┌─────────────────────────────────────┐
│ Acquiring a second set of 2D images │
│ of light returning from the object  │
│ while illuminating the object with  │
│ patterned probe light from the      │     963
│ scanner with the optical system is  │
│ in said second configuration        │
└─────────────────────────────────────┘
                  │
                  ▼
┌─────────────────────────────────────┐
│ Deriving the 3D topography of the   │
│ object based on at least the first  │     964
│ or the second set of 2D images      │
└─────────────────────────────────────┘
```

Fig. 9

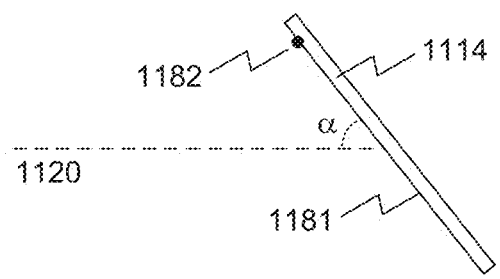
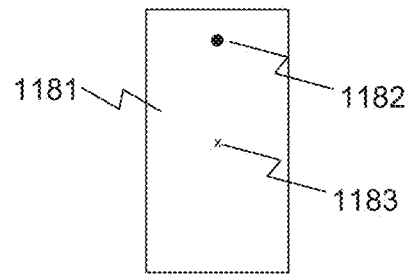
Fig. 11A　　　　　Fig. 11B
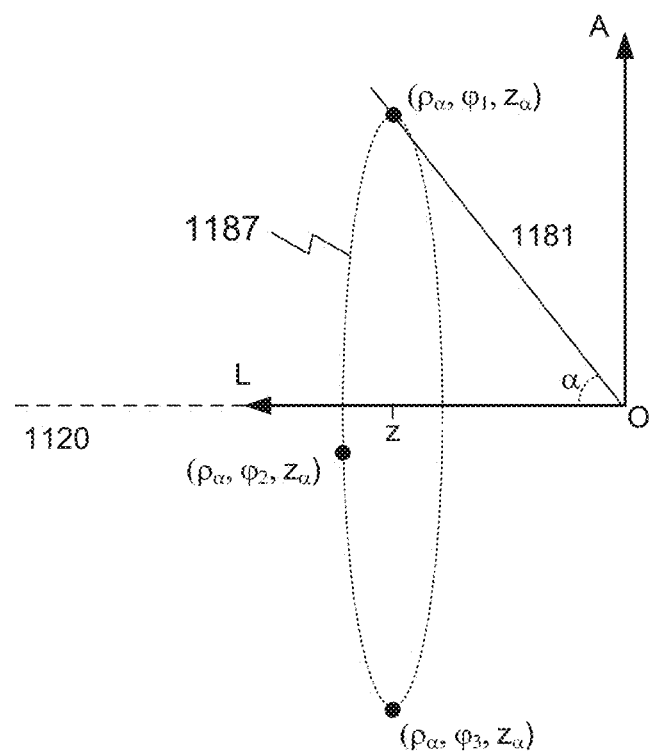
Fig. 11C

SCANNING APPARATUS WITH PATTERNED PROBE LIGHT

TECHNICAL FIELD

The application relates to three dimensional (3D) scanning of an object, where the 3D topography of the object is recorded. In particular, the application relates to a 3D scanner where a patterned probe light is used for the scanning of the object and where the 3D scanner is capable of shifting the position of the pattern on the object. One application is within dentistry, particularly for intraoral scanning or for scanning dental impressions or physical dental models in a desktop scanner; another application is within the field of quality control.

BACKGROUND 3D scanners which operate by projecting a patterned probe light onto the scanned object are known from the art, such as the 3Shape TRIOS intra-oral scanner and the ConfoCam C1+ scanning module by Confovis GmbH.

The Confovis technology is based on an illumination unit with a patterned mask having reflective regions defining the pattern. When the mask is exposed from one side with light from one light source a pattern of transmitted light rays propagates from the mask towards the object. When the mask is exposed from the other side with light from another light source, at pattern of light rays reflected from the pattern propagates towards the object. The reflected and the transmitted patterns emerge from opposite parts of the mask such that on the illuminated object they are offset from each other.

One disadvantage of the Confovis design is that two light sources are required for the illumination of the pattern. Further, the Confovis system is not capable of providing a gradual shift between the two patterns.

SUMMARY

It is an object of the present application to provide a 3D scanner utilizing a pattern exposure approach where the 3D scanner is capable of shifting the position of the pattern on the illuminated object.

It is an object of the present application to provide a 3D scanner utilizing a pattern exposure approach where the 3D scanner is capable of gradually shifting the position of the pattern on the illuminated object.

It is an object of the present application to provide a 3D scanner utilizing a pattern exposure approach where the 3D scanner is capable of dynamically shifting the position of the pattern on the illuminated object.

It is an object of the present application to provide a 3D scanner utilizing a pattern exposure approach where the 3D scanner is capable of recording the texture of the object without the pattern of the probe light interfering with the texture recording.

It is an object of the present application to provide a 3D scanner utilizing a pattern exposure approach where the 3D scanner is capable of improving the 3D topography recording by reducing the interaction/interference of the surface with the pattern of the light used for illuminating the object.

It is an object of the present application to provide a 3D scanner utilizing a pattern exposure approach where the 3D scanner adapted to have a known temporal correlation between the position of the pattern on the object and the acquisition of 2D images used for the generation of a digital 3D representation of the object.

Disclosed is a 3D scanner for recording the 3D topography of an object, the 3D scanner comprising:
- an illumination unit configured for providing probe light for illuminating the object, where the probe light comprises a pattern of light rays;
- an image sensor for acquiring one or more 2D images of light rays returning from the illuminated object;
- an optical system comprising an optical element arranged such that the patterned probe light passes through the optical element when propagating towards the object from the illumination unit along an optical path; and
- a device for changing the configuration of the optical system between a first and a second configuration, where the change in configuration comprises a change in orientation of the optical element between a first orientation and a second orientation relative to the optical path of the probe light such that the change of configuration provides a shift in the position of the probe light pattern on the illuminated object.

The 3D topography of the object can be derived from the acquired 2D images using e.g. correlation measures as described below in relation to a focus scanning embodiment of the 3D scanner.

The processing of the 2D images when deriving the 3D topography can be performed in a data processing unit of the 3D scanner or in an external unit to which the 2D images are transferred from the 3D scanner or one part of the processing can be performed in the 3D scanner and another part in an external unit. The external unit may be a personal computer or a dedicated data processing unit forming part of a scanner system which also comprises the 3D scanner.

In the first and second configurations the optical element is arranged in the first and second orientations, respectively, relative to the optical path of the probe light.

In the context of the present invention, the phrase "changing between the first and second configuration of the optical system" is used both in relation to changing from the first to the second configuration and vice versa.

Disclosed is a 3D scanner for recording the 3D topography of an object, the 3D scanner comprising:
- an illumination unit configured for providing probe light for illuminating the object, where the probe light comprises a pattern of light rays;
- an image sensor for acquiring one or more 2D images of light rays returning from the illuminated object;
- an optical system comprising an optical element arranged such that the patterned probe light passes through the optical element when propagating towards the object from the illumination unit; and
- a device for changing the configuration of the optical system between a first and a second configuration, where the change in configuration provides a shift in the position of the probe light pattern on the illuminated object.

The shift in the position of the pattern when changing from the first to the second configuration may be determined by the properties of the optical element, such as the dimensions and/or optical properties of the optical element.

The optical path is defined by the propagation of the light from the illumination unit to the image sensor. The optical path may be a non-straight line, for example when the light is reflected, scattered, divided and/or the like provided e.g. by means of beam splitters, mirrors, optical fibers and the like.

In some embodiments, the patterned probe light is such that in a plane substantially transverse to the optical path, the light intensity varies with relatively brighter and relatively darker regions.

In some embodiments, the pattern of light rays is such that in a plane substantially transverse to the optical path, the light intensity varies according to a checkerboard pattern with alternating relatively brighter and relatively darker regions, where the checkerboard pattern preferably has a periodicity which is substantially uniform over a substantial part of the pattern.

For some embodiments, it is not necessary that the pattern is periodic as long as the variation in the light intensity provided by the pattern is known. This may e.g. be the case when the 3D scanner has a known temporal correlation between the position of the pattern on the object and the acquisition of 2D images.

In some embodiments the device for changing the configuration operates by changing the orientation of the optical element between a first orientation and a second orientation relative to the optical path of the probe light, where the optical system is in the first configuration when the optical element is arranged according to the first orientation and in the second configuration when the optical element is arranged according to the second orientation. The change of configuration thus comprises a change in orientation of the optical element between the first orientation and the second orientation relative to the optical path of the probe light such that the change of configuration.

When the probe light passes through the optical element it preferably intersects one or more surfaces of the optical element. In some embodiments, the change in orientation of the optical element between the first and the second orientation relative to the optical path provides that the angle between the optical path and at least one of the intersected surfaces of the optical element changes.

The change in the orientation of the optical element changes the offset provided to the propagation vector of the probe light rays from the illumination unit such that the position of the probe light pattern on the illuminated object shifts with the change of orientation.

One advantage of controlling the configuration of the optical system and hence the shift in the position of the pattern on the illuminated object by the orientation of the optical element is that the shift when using e.g. a glass plate of uniform thickness may change gradually with the change in orientation. For such an optical element the shift in the position of the pattern increases gradually with the angle between the normal of the optical element and the optical path, such that by controlling this angle, the shift in the pattern position can be varied gradually and smoothly. This cannot be achieved by a system where the position shift is based on changing from an illumination of the object with light transmitted through a mask to an illumination with light reflected from the mask.

A gradual and smooth change in the orientation of the optical element can be realized such that the timing of the acquisition of the 2D images determines the shift in the position of the pattern between two subsequently acquired 2D images.

In some embodiments the change in the orientation of the optical element comprises a rotation around the optical path of the probe light at the optical element.

This can e.g. be realized when the device for changing the configuration comprises a motorized rotation stage capable of holding the optical element at an acute angle relative to the optical path and rotating the optical element around the optical path of the probe light at the optical element. One advantage of this type of rotation is that the shift in the position can be made such that it has components along both axes of a plane transverse to the optical path. When e.g. performing a full 360° rotation of the optical element, the shift in the position of the pattern can form a circle.

In some embodiments the change in orientation of the optical element comprises a rotation around an axis perpendicular to the optical path of the probe light at the optical element.

When the optical element is a glass plate the rotation axis (i.e. the axis which the rotation of the glass plate is around) can also be perpendicular to the normal of the glass plate, whereby the rotation provides that the angle between the normal and the optical path changes. One advantage of this design is that a continuous shift in the position of the pattern on the illuminated object can be achieved by controlling the angle of the rotation.

In some embodiments, the optical system comprises a motorized rotation stage comprising a first part and a second part, where the optical element is arranged on the second part and the motorized rotation stage is configured for rotating the second part relative to the first part around a rotation axis of the rotation stage. The optical element is arranged on the rotating second part of the rotation stage in such a manner that the propagation vector of the light rays from the illumination unit is offset after the optical element in a direction preferably determined by the orientation of the optical element relative to the propagation vector such that a shift in the position of the probe light pattern on the illuminated object is provided by a rotation of the second part of the rotation stage.

The optical element is preferably arranged on the second part of the motorized rotation stage in such a manner that when the second part is rotated the optical element is rotated around the optical path of the probe light.

In some embodiments, the rotation axis of the rotation stage and the optical path at the optical element are substantially parallel.

Here the phrase: "the optical path at the optical element" refers to the optical path just before the light rays impinging on the surface of the optical element.

When the rotation axis of the rotation stage is substantially aligned with the optical path, i.e. when the second part rotates around the optical path, the optical element is rotated around the optical path such that a shift in the position of the probe light pattern on the illuminated object is provided by a rotation of the second part of the rotation stage.

The first part of the motorized rotation stage can be fixated to the remaining parts of the 3D scanner, such as fixated directly or indirectly to a casing of the scanner. Preferably the first part is arranged in a fixed position and orientation relative to the image sensor.

One advantage of such a motorized rotation stage design is it can have a small sensitivity to mechanical tolerances and that a huge gearing between the rotation of the first and the second can provide a very precise shift of the position of the pattern on the object. Another advantage is that the shift in the position can be made gradual between the first and the second configuration.

Equipping a 3D scanner with such an optical system comprising an optical element arranged on a motorized rotation stage design provides that the position of the pattern on the illuminated object gradually and dynamically can be changed.

In some embodiments, the device for changing the configuration of the optical system is capable of gradually changing the configuration between the first and the second configuration through a number of intermediate configurations.

The intermediate configurations may be such that the change of configuration is substantially continuous whereby the shift in the position of the pattern on the illuminated object is substantially continuous when changing between the first and second configuration of the optical system.

When designing the optical system such that the rotation of the optical element can be made gradually between the first and second configuration, the scanner is capable of providing a gradual and potentially continuous shift in the position of the pattern on the object. This effect cannot be achieved by prior art scanner systems such as the ConfoCam C1+ scanning module, in which a shift in the pattern position is caused by the difference in the path of light rays reflected and transmitted by a pattern generating mask.

In some embodiments, the optical element comprises a glass plate, such as an AR coated glass plate.

The optical element may consist of a plate with a uniform refractive index and uniform thickness, i.e. the surfaces to the surrounding atmosphere which the light rays are incident upon are parallel. When light rays are incident on such a glass plate along its normal no offset is provided to the propagation vector of the light rays. In that case, light rays of the probe light pass through the glass plate without any offset. When the glass plate is arranged at an acute angle relative to the optical path, the incident light rays are offset due to refraction at the surfaces. If the glass plate has an acute angle relative to a horizontal or vertical axis, the pattern shifts in the vertical or horizontal direction, respectively. When rotating the optical element around an axis perpendicular to the optical path of the probe light where the perpendicular axis is horizontally arranged, the pattern shifts up or down. When rotating the optical element around an axis perpendicular to the optical path of the probe light where the perpendicular axis is vertically arranged, the pattern in to the left or right.

When rotating the glass plate around the optical path, the position of the pattern is shifted such that the pattern moves in circles on the illuminated object, i.e. a given point in the pattern rotates around a center of rotation for that particular point.

One advantage of using an optical system with an optical element which displaces the propagation vector of the light rays depending on its orientation is that it allows for a simple and gradual/continuous control on the light ray offset on the illuminated object.

In some embodiments, the optical element consists of a glass plate, such as an AR coated glass plate.

In some embodiments, the optical element is arranged such that it offsets the light rays of the probe light in both the first and second configuration of the optical system, where the magnitude of the offsets in the first and second configurations are determined by the properties of the optical element, such as the dimensions and/or optical properties of the optical element.

In some embodiments, the device for changing the configuration operates by changing the optical properties of the optical element.

One advantage of such an embodiment is that no movement of components in the scanner is required to provide the shift in the position of the pattern on the illuminated object.

In some embodiments the optical property which is changed is the refractive index of the material of the optical element, such that the change between the first and the second configuration is provided by the change in the refractive index.

In some embodiments the optical element comprises an electro-optic material and the device for changing the configuration is capable of applying an electrical field to the electro-optic material such that the refractive index of the optical element changes between a first and a second value.

When such an optical element is arranged at a fixed angle relative to the optical path of the probe light, the magnitude of the offset provided to the propagation vector of the incident light rays is determined by the refractive index of the optical element. The shift in the position of the patterned probe light on the illuminated object can then be controlled by the electrical field applied to the optical element.

One advantage of such a design is that no movement of components in the scanner is required to provide the shift in the position of the pattern on the illuminated object.

One advantage of using an optical system with an optical element which displaces the propagation vector of the light rays depending on its refractive index is that it allows for a simple and gradual/continuous control on the light ray offset on the illuminated object by adjusting the applied electrical field.

In some embodiments the scanner comprises a beam splitter arranged such that it directs the light received from the object towards the image sensor. Such a beam splitter is often located in the optical path and where it is arranged such that it allows the probe light from the illumination unit to propagate towards the object while it directs light received from the object towards the image sensor.

In some embodiments the optical element is arranged between the illumination unit and the beam splitter.

In this case the light of the 2D images recorded by the image sensor travels from the object to the image sensor without having to pass through the optical element. The effect of this is that when the configuration of the optical system is changed the pattern is moved on the object relative to the image sensor. This can be utilized to acquire 2D images where the dark spots of the probe light pattern are removed, such that e.g. the texture of the object can be recorded with higher resolution. A 3D scanner design with such an arrangement of the optical element and beam splitter thus allows for a 3D scanner utilizing a pattern exposure approach where the pattern of the probe light does not interfere with the recording of the texture of the object.

In some embodiments the configuration of the optical system is changed during the acquisition of a 2D image, and the offset provided by the optical element is such that the pattern is shifted a distance corresponding to half a period of the pattern on the illuminated object. I.e. ratio between the shift in the position of the patterned probe light on the object and the periodicity of the pattern is hence ½. The same effect is obtained when the ratio is (N+½) where N is an integer. If such a 2D image is acquired with a scanner where the optical element is arranged between the illumination unit and the beam splitter, the dark spots of the pattern are removed. Alternatively, two subsequently acquired 2D image which record light from substantially the same part of the object but with the optical system in different configurations are combined. This also provides that the pattern cannot be seen in the combined 2D image and the texture of the object can be recorded with a resolution which is not limited by the pattern. Such a scanner design will make possible to acquire some 2D images for the recording of the 3D topography and other images for recording the texture of the object, and thus allows for a 3D scanner utilizing a pattern exposure approach where the pattern of the probe light does not interfere with the recording of the texture of the object.

In some embodiments the beam splitter is arranged between the optical element and the illumination unit, such that the optical element is arranged between the beam splitter and the object when scanning an object. In this case the light of the images recorded by the image sensor travels through the optical element on the way from the object to the image sensor. The offset in the propagation vector of the probe light provided by the optical element when the probe light propagates towards the object is then compensated by a reverse offset provided to the light returning from the object, i.e. with this double-pass configuration there is no shift in the position of the pattern at the image sensor when the optical system is provides a shift in the position of the patterned probe light on the object.

The effect of this is that when the configuration of the optical system is changed it appears that the object has moved relative to the image sensor. This can be utilized to acquire images with reduced noise.

The surface of the object may interfere with the pattern and/or other parts of the system leading to small but systematic errors. This error becomes an increasing problem as the resolution of the scanner improves. Averaging over multiple captures does not reduce these errors, however if slightly different views are averaged, i.e. images acquired with the patterned probe light shifted between the images, the error can be reduced. The optical element allows for a precise shifting of views and the scanner according to some embodiments can provide a solution to this problem.

A 3D scanner design with such an arrangement of the optical element and beam splitter thus allows for a 3D scanner utilizing a pattern exposure approach with a reduced interaction/interference of the surface with the pattern thus providing an improved 3D topography recording.

In some embodiments the pattern is periodic at least along one direction in a plane substantially transverse to the optical path.

In some embodiments, the ratio between the shift in the position of the patterned probe light on the object when changing between the first and second configuration and the periodicity of the pattern is ½.

One advantage of this design is that when 2D images acquired with the optical system in its first and second configurations are combined the pattern cannot be seen in the combined 2D image and the texture of the object can be recorded with a resolution which is not limited by the pattern.

In some embodiments, the 3D scanner changes the configuration of the optical system between the acquisition of two subsequently acquired 2D images. This provides that when one 2D image is acquired with the optical system in one configuration the subsequent 2D image is acquired with the optical element in another configuration.

This may be achieved by adapting the image sensor and the optical system to provide that the acquisition of the 2D images is a synchronized with the changing of the configuration of the optical system such that the configuration of the optical system is changed between the acquisitions of two subsequently acquired 2D images.

In some embodiments, the 3D scanner changes the configuration of the optical system between the first and second configuration during the acquisition of a 2D image.

This provides that the acquired 2D image records light with the optical system both in the first and the second configuration The change in configuration can be realized by a control unit of the scanner, such as by a control unit configured for controlling the rotation of a motorized rotation stage on which the optical element is arranged.

In some embodiments, the illumination unit comprises an array of light emitters, such as a multi-die LED with a plurality of LED dies arranged in a LED array, where the light emitters are arranged such that the light from the emitters define the pattern of the probe light In some embodiments, the illumination unit comprises a pattern generating element and a light source configured for projecting light onto at least part of the pattern generating element thereby defining the pattern of the probe light. The pattern generating element is arranged after the light source such that the probe light from the light source travels through it whereby the pattern generating element incorporates the pattern in the light emitted from the light source.

The pattern generating element may comprise a glass plate with an opaque mask. The pattern may be a uniform pattern such as a checkerboard pattern or a line pattern for some embodiments while for other embodiments there is no preference for a uniform pattern.

In some embodiments, the light source is a multichromatic light source, such as a white light source.

Preferably a single light source of the scanner provides the light for the illumination of the object on both configurations of the optical system.

This is made possible by the optical system of a scanner according to the present application being capable of changing between configurations which provide different shifts in the position of the pattern on the object, and allows for a scanner in which a second light source is not needed.

The scanner may comprise a number of optical components in addition to the optical element which provides the shift in the pattern position. The additional components can be an arrangement of one or more lenses, beamsplitters, mirrors, etc.

In some embodiments, the optical system comprises one or more polarizing element selected to provide e.g. that specular reflections from an object are amplified such that e.g. 3D topography of teeth can be recording without the need for spraying these with a reflective material. Polarizing optics can also be applied to reduce problems with stray light in the scanner.

In some embodiments, the scanner comprises one or more data processing units configured for handling at least part of the process of deriving the 3D topography of the object from the acquired 2D images.

In some embodiments, the scanner is be connected to an external unit, either by a wired or a wireless connection allowing data transfer between the scanner and the external unit, and part of the said process of deriving the 3D topography is handled in a data processing unit comprised in said external unit.

In some embodiments, the image sensor is capable of recording color 2D images of the object. This allows for a recording of the color of the object. The color image sensor may be a CCD with a color filter, such as a Bayer filter.

The texture recorded by the 3D scanner may comprise the color and/or surface roughness of the object.

In some embodiments, the scanner comprises a control unit connected to the optical system such that it can control the configuration of the optical system, e.g. by applying an electrical field to an optical element comprising an electro-optic material or by controlling the orientation of the optical element relative to the optical path.

In some embodiments, the scanner is a desktop scanner configured for recording the 3D topography of an object by acquiring a number of 2D images of the object.

In some embodiments, such as in embodiments utilizing the focus scanning technique, the 3D topography of the object is derived from a plurality of recorded 2D images. The scanner then comprises optical components, potentially as part of the optical system, where said components are configured for defining a focus plane of shallow Depth of Field and for periodically translating the focus plane through a number of focus plane positions relative to the scanner. When scanning an object, the scanner is held such that the focus plane at one or more of said focus plane positions is located at the object. For a given relative position of the scanner and the object a stack of 2D images is obtained with each 2D image being acquired at a different focus plane position relative to the object. The focus plane position may be varied by means of at least one focus element, e.g., a moving focus lens.

In some embodiments, the scanner comprises means for evaluating a correlation measure at each focus plane position between at least one image pixel and a weight function, where the weight function is determined based on information of the configuration of the spatial pattern. Determining in-focus information may then relate to calculating a correlation measure of the spatially structured light signal provided by the pattern with the variation of the pattern itself (which we term reference) for every location of the focus plane and finding the location of an extremum of this series. In some embodiments, the pattern is static. Such a static pattern can for example be realized as a chrome-on-glass pattern.

One way to define the correlation measure mathematically with a discrete set of measurements is as a dot product computed from a signal vector, I=(I1, ..., In), with n>1 elements representing sensor signals and a reference vector, f=(f1, ..., fn), of reference weights. The correlation measure A is then given by $$A = f \cdot I = \sum_{i=1}^{n} f_i I_i$$

The indices on the elements in the signal vector represent sensor signals that are acquired at different pixels, typically in a block of pixels. The reference vector f can be obtained in a calibration step.

Surface details on the object may interfere with the correlation measure if it has a similar characteristic as the pattern. In this case the correlation measure does not reflect only the pattern and can lead to a bias in the found 3D point. Given knowledge of the surface texture the correlation measured can be corrected for this undesirable correlation, by normalize the sensor signal with the texture image.

Defining the texture of the same pixels as T=(T1, ..., Tn), which can e.g. can be obtained by make an synthetic 2D from images obtained in configuration 1 and 2 corresponding to a shift of one half period, the corrected correlation measure A' is given by:

$$A' = \sum_{i=1}^{n} f_i \cdot (I_i / T_i)$$

In other words the images sensor signal is scaled by the texture, so in areas with dark texture the image sensor signal is amplified, whereas in light areas the signal is attenuated. This way signal variations due to the nature of the surface is removed and only the signal variation due to the pattern remains.

There may be areas of a surface where the signal is very weak. In these areas, the correlation measure will be noisy and hence the detection of the extremum becomes increasingly uncertain. The texture information reveals such areas and allows for a reliability score for the particular block to be calculated. A simple score is looking at the number of pixels in the texture image contributing to the correlation measure which are below a certain threshold. The larger the number the more uncertain the correlation measure, extrumum and 3D point is. Above a certain threshold the 3D point is too uncertain and can be excluded from the scan.

By using knowledge of the optical system used in the scanner, it is possible to transform the location of an extremum of the correlation measure, i.e., the focus plane into depth data information, on a pixel block basis. All pixel blocks combined thus provide an array of depth data. In other words, depth is along an optical path that is known from the optical design and/or found from calibration, and each block of pixels on the image sensor represents the end point of an optical path. Therefore, depth along an optical path, for a bundle of paths, yields a 3D surface geometry within the field of view of the scanner.

It can be advantageous to smooth and interpolate the series of correlation measure values, such as to obtain a more robust and accurate determination of the location of the maximum. For example, a polynomial can be fitted to the values of A for a pixel block over several images on both sides of the recorded maximum, and a location of a deducted maximum can be found from the maximum of the fitted polynomial, which can be in between two images.

A number of techniques exist for deriving the 3D topography of an object based on acquired 2D images, where the technique may depend on the utilized scanner concept. Often these techniques are based on the part(s) of the 2D image corresponding to the light received from the object. This may e.g. the case in a focus scanner where for a given relative position of the scanner and the object a stack of 2D images is obtained with each 2D image being acquired at different position of the focus plane relative to the object. The in-focus portions of the 2D images of a stack are identified and then used to generate a partial digital 3D representation of the part of the object scanned from this particular relative position. To derive the 3D topography of an object, typically several partial digital 3D representations of the object have to be combined to a full digital 3D representation expressing the 3D topography of (the scanned part of) the object, where the partial digital 3D representations have sections that overlap with sections of partial digital 3D representations acquired from slightly different relative positions of scanner and object.

For a focus scanner, a stack of 2D images may correspond to one pass of the focusing element(s), i.e. for a focus scanner each partial digital 3D representation is the 3D surface geometry derived from the stack of 2D images recorded during the pass of the focus plane position between its extremum positions.

The partial digital 3D presentations found for various relative positions of the scanner and the object can be combined by computer implemented algorithms for stitching and registration as widely known in the literature, or from known view positions and orientations, for example when the scanner is mounted on axes with encoders. One example of such an algorithm is the Iterative Closest Point algorithm.

In some embodiments, the scanner and/or the scanner system is configured for combining partial digital 3D representations of the object surface obtained from different relative positions to obtain a full 3D topography of the object.

In some embodiments, the scanner is adapted for having a temporal correlation between the acquisition of the 2D images using the image sensor and the change in the configuration of the optical system. For each focus plane position, the scanner may be adapted to provide that the configuration of the optical system changes continuously with a known frequency and to provide that 2D images are acquired e.g. every time the system is in the first configuration and every time it is in the second configuration. This can be achieved by having an image acquisition frequency which is twice the frequency of the change in the configuration of the optical system.

Disclosed is a scanner for recording the 3D topography of an object, the scanner comprising:
- an illumination unit configured for providing probe light for illuminating the object, where the probe light comprises a pattern;
- an image sensor for acquiring one or more 2D images of light from the illuminated object; and
- an optical system comprising an optical element, where the optical system is capable of changing the orientation of the optical element between a first and a second orientation relative to the illumination unit and/or relative to the image sensor;

where the change of the orientation of the optical element provides an offset to the probe light pattern illuminating the object in a plane transverse to the optical path of the scanner at the object.

Disclosed is a scanner for recording the 3D topography of an object, the scanner comprising:
- an illumination unit configured for providing probe light to a scan volume of the scanner, where the probe light comprises a number of light rays which are distributed such that in a plane transverse to the optical path in said scan volume the light rays form a pattern;
- an image sensor for acquiring one or more 2D images of light from the scan volume; and
- an optical system comprising an optical element arranged such that the patterned probe light passes through the optical element when propagating towards the object from the illumination unit, where the optical system is capable of changing between a first and a second configuration;

where the light rays of the probe light pattern are distributed according to a first distribution in the transverse plane in the scan volume when the optical system is in the first configuration, and according to a second distribution when the optical system is in the second configuration.

The change between the first and the second configuration of the optical system is such that it provides a shift in the position of the probe light pattern on an object arranged in said scan volume and illuminated by said probe light.

In some embodiments, the change from the first to the second configuration of the optical system provides a gradual shift in the distribution of the light rays in said transverse plane.

Disclosed is a method for recording the 3D topography of an object, the method comprising:
- providing a 3D scanner according to one of the embodiments;
- acquiring a first set of 2D images of light returning from the object while illuminating the object with patterned probe light from the 3D scanner with the optical system is in said first configuration
- acquiring a second set of 2D images of light returning from the object while illuminating the object with patterned probe light from the 3D scanner with the optical system is in said second configuration; and
- deriving the 3D topography of the object based on at least the first or the second set of 2D images.

Disclosed is a method for recording the 3D topography of an object, the method comprising:
  i. providing a 3D scanner according to one of the embodiments;
  ii. acquiring a first 2D image of light returning from the object while illuminating the object with patterned probe light from the 3D scanner with the optical system is in the first configuration;
  iii. changing the optical system between the first and the second configuration;
  iv. acquiring a second 2D image of light returning from the object while illuminating the object with patterned probe light from the 3D scanner with the optical system is in the second configuration;
      where steps ii to iv are performed a number of times such that a first set of first 2D images and a second set of second 2D images are acquired; and
  v. deriving the 3D topography of the object based on at least the first or the second set of 2D images.

In some embodiments, the method comprises rotating the optical element of the optical system from the first orientation relative to the optical path of the 3D scanner to the second orientation.

In some embodiments, the method comprises rotating the optical element around an axis perpendicular to the optical path of the probe light at the optical element.

In some embodiments, the first or the second set of 2D images contains a single 2D image.

In some embodiments, the first or the second set of 2D images contains a plurality of 2D images.

BRIEF DESCRIPTION OF DRAWINGS

FIG. 9 shows steps of a method of using the 3D scanner.

FIGS. 11A, 11B, and 11C show a rotation around the optical path expressed in cylindrical coordinates.

The schematic illustrations of the scanner components given in FIGS. 1-5, 7, 10 and 11 are cross sectional views and provide 2 dimensional representations of the components which by nature are 3 dimensional structures.

FIG. 1 shows a prior art scanner design and a scanner according to the present application.

Figure 1A:
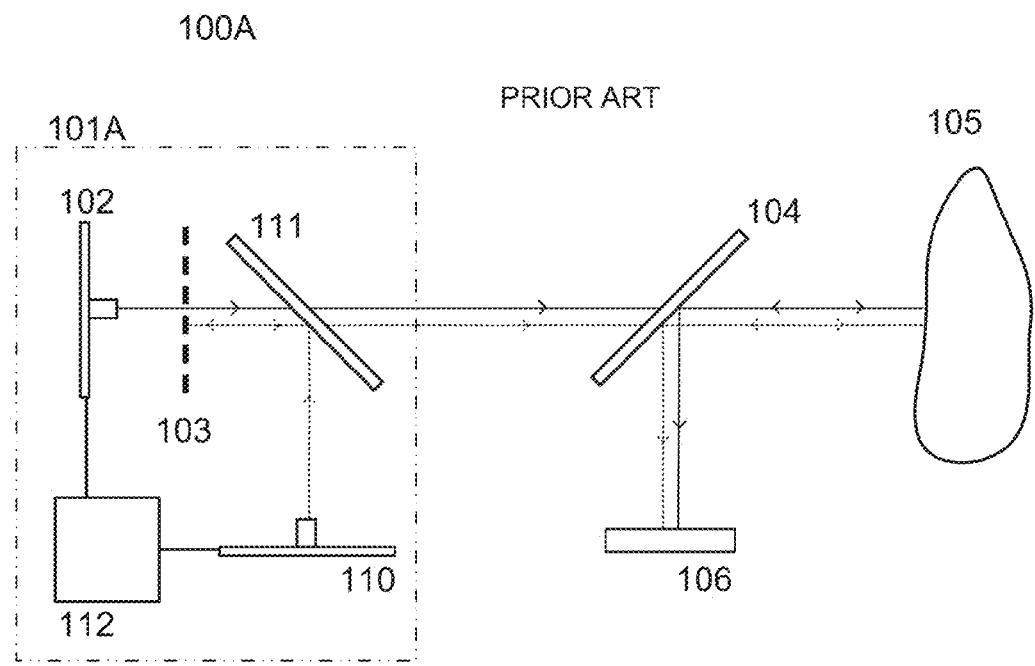
FIGS. 1A and 1B show a prior art design of a scanner and a scanner according to the present application.

FIG. 1A illustrates a prior art scanner for recording the 3D topography of an object, where the scanner 100A has an illumination unit 101A with first and second light sources 102, 110 which are activated alternatively such that only one light source emits light at any given time. The illumination unit has a patterned mask 103 with alternating reflective and transparent regions acting as a pattern generating element and defining the pattern.

When the mask 103 is exposed from one side with light from the first light source 102 a pattern of light rays is transmitted through the transparent regions of the mask such that a transmitted patterned probe light can propagate through a semitransparent mirror 111 towards the object 105.

Light emitted from the second light source 110 is directed by the semitransparent mirror 111 towards the mask 103. At the mask light is reflected from the reflective regions of the mask such that a reflected patterned probe light propagates through the semitransparent mirror 111 towards the object 105.

Since the reflected and the transmitted patterns emerge from opposite parts of the mask, the reflected and transmitted probe light patterns are offset from each other at the object. When changing from having one light source activated to having the other light source activated, a shift in the position of the probe light pattern on the illuminated object is hence provided. The activation of the light can be sources controlled by a control unit 112.

Before reaching the object, the patterned probe lights propagate through a another semitransparent mirror 104 acting as a beam splitter and being arranged such that it directs light rays returning from the illuminated object 105 towards an image sensor 106 for acquiring one or more 2D images of these light rays.

In this figure, the offset in the path of the probe light caused by the semitransparent mirror 111 is ignored for simplicity since it can be cancelled by the other semitransparent mirror 104.

Figure 1B:
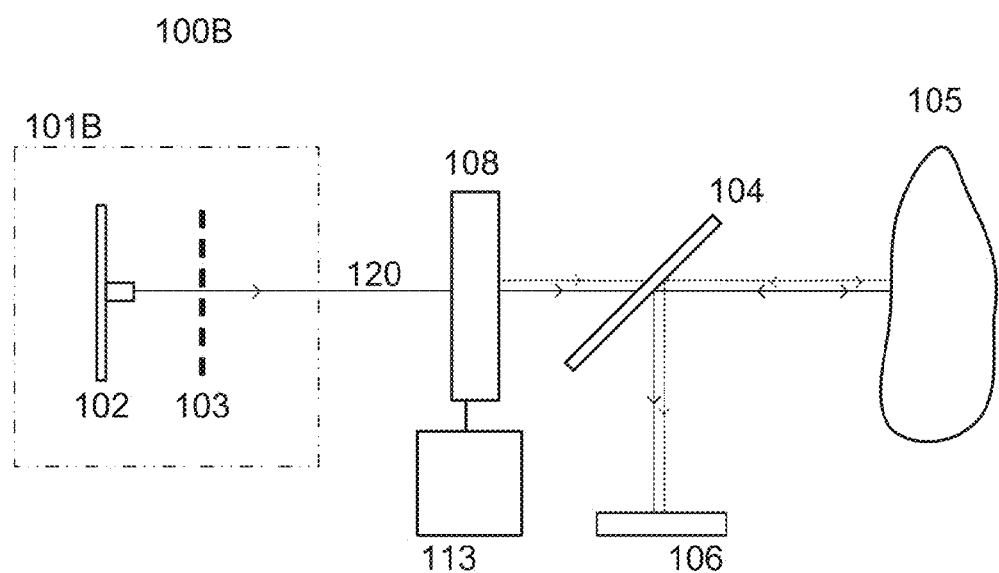

FIG. 1B illustrates an embodiment of a scanner according to the present application.

The scanner 100B comprises an illumination unit 101B configured for providing probe light for illuminating the object. The illumination unit comprises a light source 102 and patterned mask 103 with alternating transparent and light absorbing/reflecting regions acting as a pattern generating element, such that the probe light 120 emerging from the illumination unit comprises a pattern of light rays.

Before reaching the object 105, the patterned probe lights propagate through a beam splitter 104 (here illustrated as a semitransparent mirror) arranged such that it directs light rays returning from the illuminated object 105 towards an image sensor 106 for acquiring one or more 2D images of these light rays.

The scanner has an optical system 108 which comprises an optical element arranged such that the patterned probe light 120 passes through optical element when propagating towards the object 105 from the illumination unit 101B. The scanner further comprises means 113 for changing the configuration of the optical system 108 between a first and a second configuration, where the change of configuration provides a shift in the position of the probe light pattern on the illuminated object 105. In the figure, the shift is illustrated by the offset in the path of one light ray after the optical system 108 where the dotted line is the light ray which has been shifted relative to the path of the light ray in the other configuration.

Figure 2:
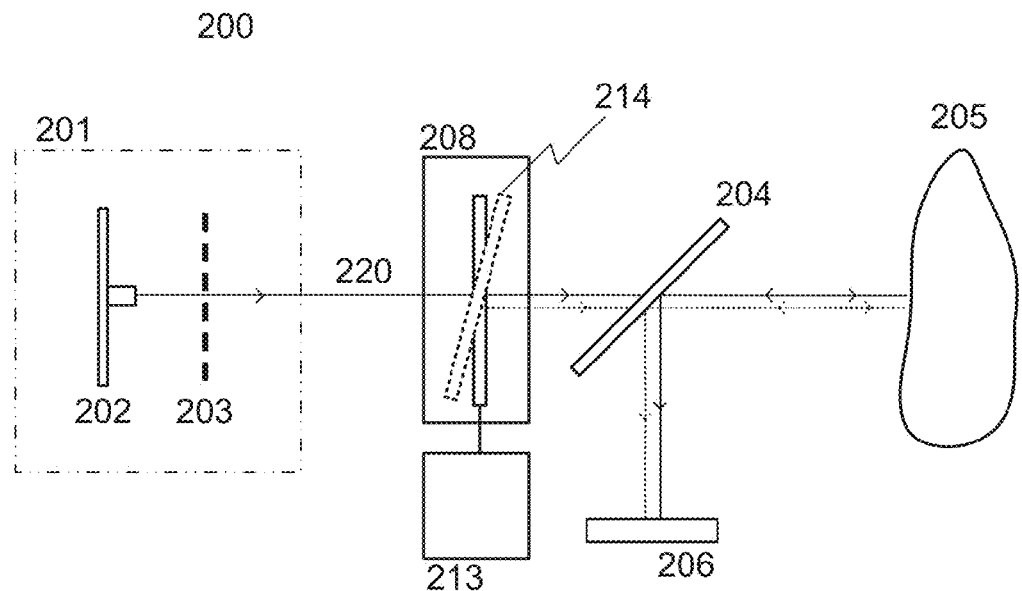
FIGS. 2 and 3 show embodiments of a 3D scanner.
Figure 3:
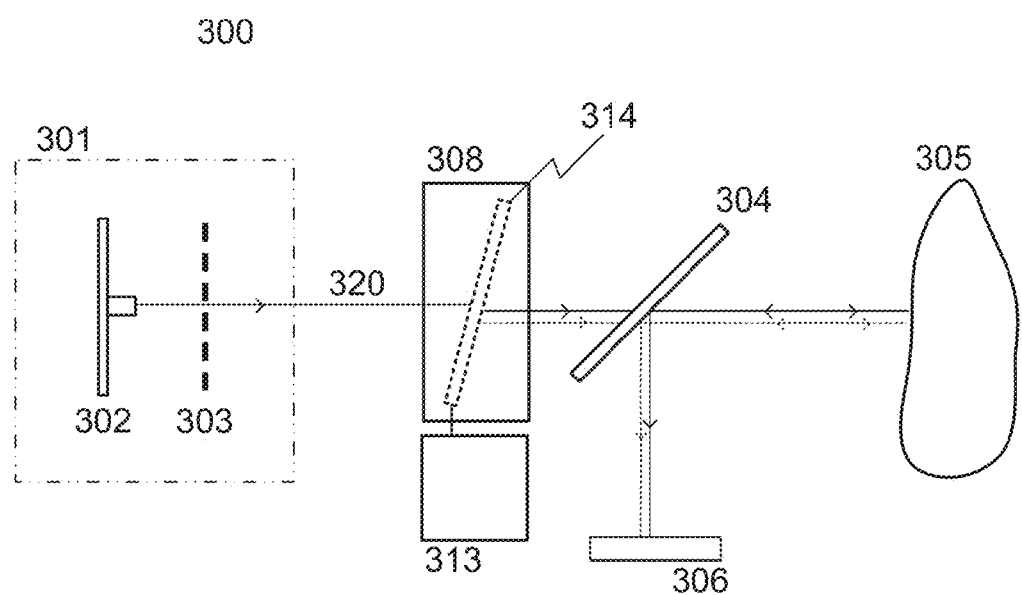

FIGS. 2 and 3 illustrate embodiments of a scanner according to the present application.

The scanner 200, 300 comprises an illumination unit 201, 301 comprising a light source 202, 302 and patterned mask 203, 303 with alternating transparent and light absorbing/reflecting regions, such that the illumination unit emits patterned probe light 220, 320 towards the object 205, 305. Before reaching the object, the patterned probe light propagate through a beam splitter (here illustrated as a semitransparent mirror) 204, 304 arranged such that it directs light rays returning from the illuminated object towards an image sensor 206, 306 for acquiring one or more 2D images of these light rays. The scanner also has an optical system 208, 308 with an optical element 214, 314 arranged such that the patterned probe light 220, 320 passes through it when propagating towards the object 205, 305 from the illumination unit 201, 301. A control unit 213, 313 is connected to the optical system and can act as a device for changing the configuration of the optical system between a first and a second configuration, where the change of configuration provides a shift in the position of the probe light pattern on the illuminated object 205, 305.

In FIG. 2 the optical element 214 of the optical system 208 is an AR coated glass plate and the means 213 for changing the configuration of the optical system operates by changing the orientation of the glass plate between a first orientation and a second orientation relative to the optical path of the probe light 220. This can e.g. be realized by arranging the glass plate 214 in one of the devices illustrated in FIG. 8. When the glass plate is in the first orientation (indicated by the full line in the figure), the optical system is in the first configuration. When the glass plate is in the second orientation (indicated by the dotted line), the optical system is in the second configuration with the pattern on the illuminated object shifted relative to its position in the first configuration. In the figure, the shift is illustrated by the offset in the path of one light ray after the optical system where the dotted line is the light ray which has been shifted relative to the path of the light ray in the first configuration. The device for changing the configuration is not depicted in FIG. 2 for simplicity's sake.

In FIG. 3 the scanner operates by changing the optical properties of the optical element 314 of the optical system 308. The optical element 314 comprises an electro-optic material, such as e.g. Lithium Niobate, and the means 313 for changing the configuration of the optical system operates by changing the electrical field applied to the electro-optic material such that the refractive index of the optical element changes between a first and a second value. The electrical field may be zero for one of the configurations.

The optical element 314 is arranged such that its normal has a finite angle relative to the optical path at the optical element such that regardless of the refractive index of the optical element there is an offset between the propagation vector of a light ray of the probe light 320 before and after propagating through the optical element 314. The refractive index of the optical element determines the offset such that by increasing the refractive index of the electro-optical material e.g. by applying stronger electrical field to the electro-optical material, the position of the pattern shifts on the illuminated object. In the figure, the shift is illustrated by the offset in the path of one light ray after the optical system where the dotted line is the light ray which has been shifted relative to the path of the light ray in the other configuration.

Both designs illustrated in FIGS. 2 and 3 have advantages over the prior art scanner illustrated in FIG. 1A. First of all, a shift in the position of the probe light pattern on the illuminated object can be provided in a scanner having only one light source. Second, the scanner can be configured such that the configuration can be changed continuously between the first and the second configuration through a number of intermediate configurations, such that the shift in the position of the pattern on the illuminated object is continuous between the position of the first and second configuration, respectively. The prior art scanner illustrated in FIG. 1A is not capable of providing such a gradual shift between the two patterns, but can only provide one of the two patterns or both. One application for a gradual shift can e.g. be in cases where it is desirable to shift the position of the pattern such that the pattern is better aligned with the pixels of the image sensor, or for texture compensation in the recording of the 3D topography of the object, or to avoid limiting texture recording by the grid of the pattern.

FIG. 4 shows the principle of embodiments operating by changing the orientation of the optical element of the optical system.

The patterned mask 403 has alternating transparent 421 and light absorbing/reflecting regions 422, such that the probe light 420 emitted from the illumination unit and projected onto the object 405 has a pattern 424 of alternating bright regions 425 and dark regions 426.

Figure 4A:
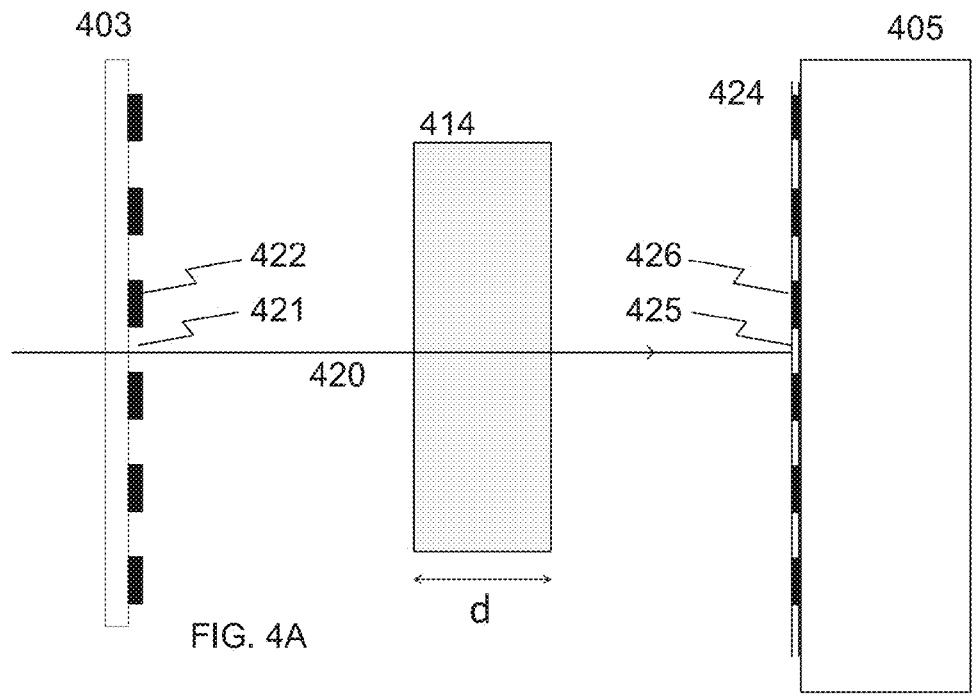
FIGS. 4A and 4B show the principle of embodiments operating by changing the orientation of the optical element of the optical system.

In FIG. 4A the optical element 414 of the optical system is arranged such that the patterned probe light 420 passes through it when propagating towards the object 405. The optical element can be a glass plate of uniform thickness d (i.e. having parallel sides) which in the first configuration is arranged such that its normal is parallel to the propagation vector of the probe light ray 420. In this configuration the light rays of the probe light passes through the optical element without any offset and a light ray impinges on the object at the same position as it would if it had not propagated through the glass plate.

Figure 4B:
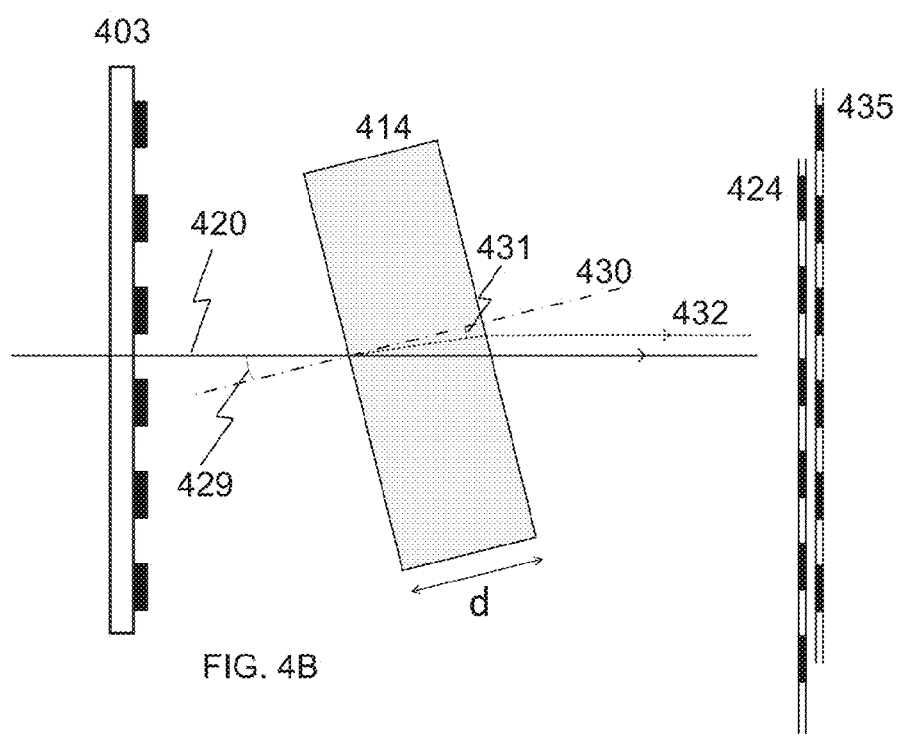

In FIG. 4B the orientation of the optical element 414, i.e. the glass plate, is changed to a second orientation where the normal 430 to the glass plate has a non-zero angle 429 relative to the optical path of the probe light 420 emitted from the illumination source. As described by Snell's law the light rays of the probe light are refracted at both boundaries between air and glass at the glass plate. At the first boundary, the light ray is refracted by an angle 431 such that it propagates through the glass plate at an angle relative to the optical path before the glass plate. At the second boundary the light rays is again refracted. Since the glass plate has parallel sides, the magnitude of the reflection angle is the same as at the first boundary light but with the opposite sign. After the glass plate, the light ray 432 hence propagates in the same direction as before the glass plate but with an offset relative to the light ray in the first configuration. This provides that the pattern at the object in the second configuration 435 is offset relative to the pattern at the in the first configuration 424.

For a glass plate with uniform thickness, d, and refractive index, n, the offset provided when the glass plate when arranged at an angle, $\theta_1$, is given by:

$$\text{offset} = d \cdot \sin\theta_1 \left(1 - \frac{\cos\theta_1}{\sqrt{\left(\frac{n_1}{n_2}\right)^2 - \sin^2\theta_1}}\right)$$

Plotting the offset as a function of the angle $\theta_1$ shows that the offset increases smoothly with the angle. The position of the pattern on the illuminated object can hence be shifted smoothly and gradually by controlling the angle of the glass plate relative to the optical path of the probe light.

For a scanner where the device for changing the configuration of the optical system is capable of continuously changing the configuration between the first and the second configuration through a number of intermediate configurations, the position of the probe light pattern can be shifted continuously. For a mask with a periodic pattern of periodicity $\Lambda$ the optical system can be configured for providing a shift in the position of the pattern on the object at any fraction of $\Lambda$ by adjusting the orientation of the glass plate accordingly.

In some cases it may be interesting to provide a shift in the position of the pattern on the object which equals $\Lambda/2$ such that the pattern in the second configuration is offset by half a period relative to its position in the first configuration. If the shift is performed during the capture of light for one 2D image and made such that the image sensor captures equal amounts of light in the two configurations, the effect can be that the pattern is not seen in the image. This may be advantageous when the texture of the object is to be determined without the interference of the pattern. The method of recording the 3D topography may then comprise acquiring pairs of 2D images, where each pair has one 2D image with the optical system in the first configuration and one 2D image with the optical system changing between the first and the second configuration. This approach can be applied in a focus scanner where prior art focus scanners acquire a stack of 2D images with the system in one configuration only. For each of these 2D images, a scanner according to the present application can acquire the pair of 2D images described above and use the additional 2D images to determine the texture of the object.

Figure 5A:
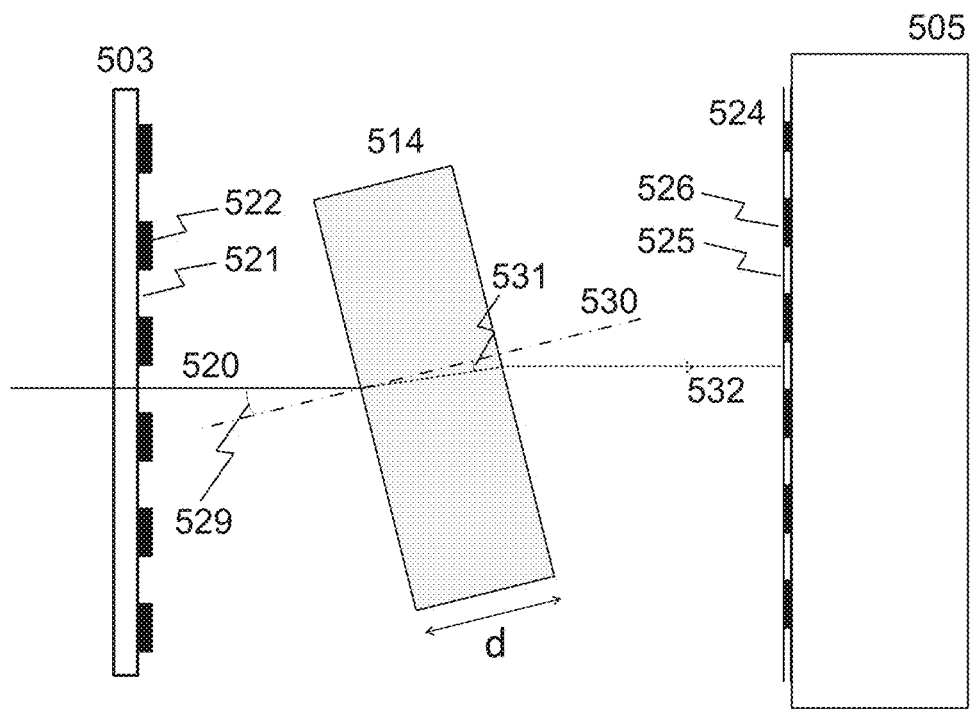
FIGS. 5A, 5B, and 5C show the principle of embodiments operating by changing the refractive index of the optical element of the optical system.

FIG. 5 shows the principle of embodiments operating by changing the refractive index of the optical element of the optical system.

The patterned mask 503 is similar to that illustrated in FIG. 4 with alternating transparent 521 and light absorbing/reflecting regions 522, such that the probe light 520 emitted from the illumination unit and projected onto the object 505 has a pattern 524 of alternating bright regions 525 and dark regions 526. The optical element can be a plate 514 of an electro-optic material, such as lithium niobate, with a uniform thickness, d, where the plate is arranged such that its normal 530 has a non-zero angle 529 to the propagation vector of the incident probe light ray 520 for all configurations of the optical system. Similar to the discussion above in relation to FIG. 4, Snell's law dictate that the light rays 520 of the probe light incident on the optical element are refracted at both boundaries between air and the material of the plate in such a manner that the propagation vector of the light ray 532 when emerging from the plate propagates in the same direction as before the plate but with an offset relative to the incident light ray 520. The propagation vector of the light ray 532 emerging from the optical element 514 is hence offset from the propagation vector of the incident light ray 520 for all configurations in this embodiment. The difference between the configurations of the optical system is the magnitude of the offset. The angle 531 between the normal 530 and the propagation vector of the probe light ray inside the optical element depends on the refractive index of the optical element 514, with the angle 531 decreasing with increasing refractive index such that the offset of the propagation vector of the probe light 532 emerging from the optical element increases with increasing refractive index.

Figure 5B:
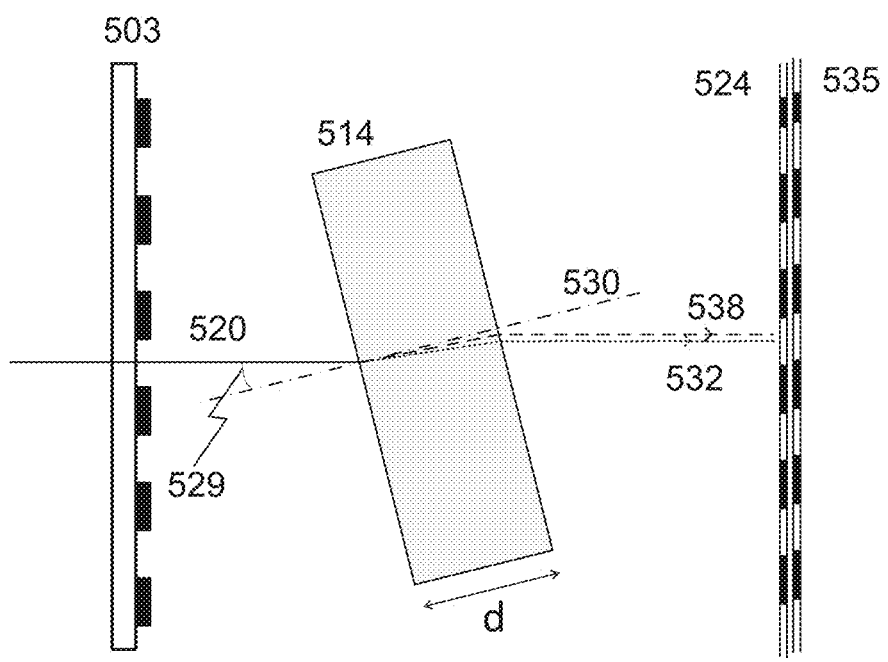
Figure 5C:
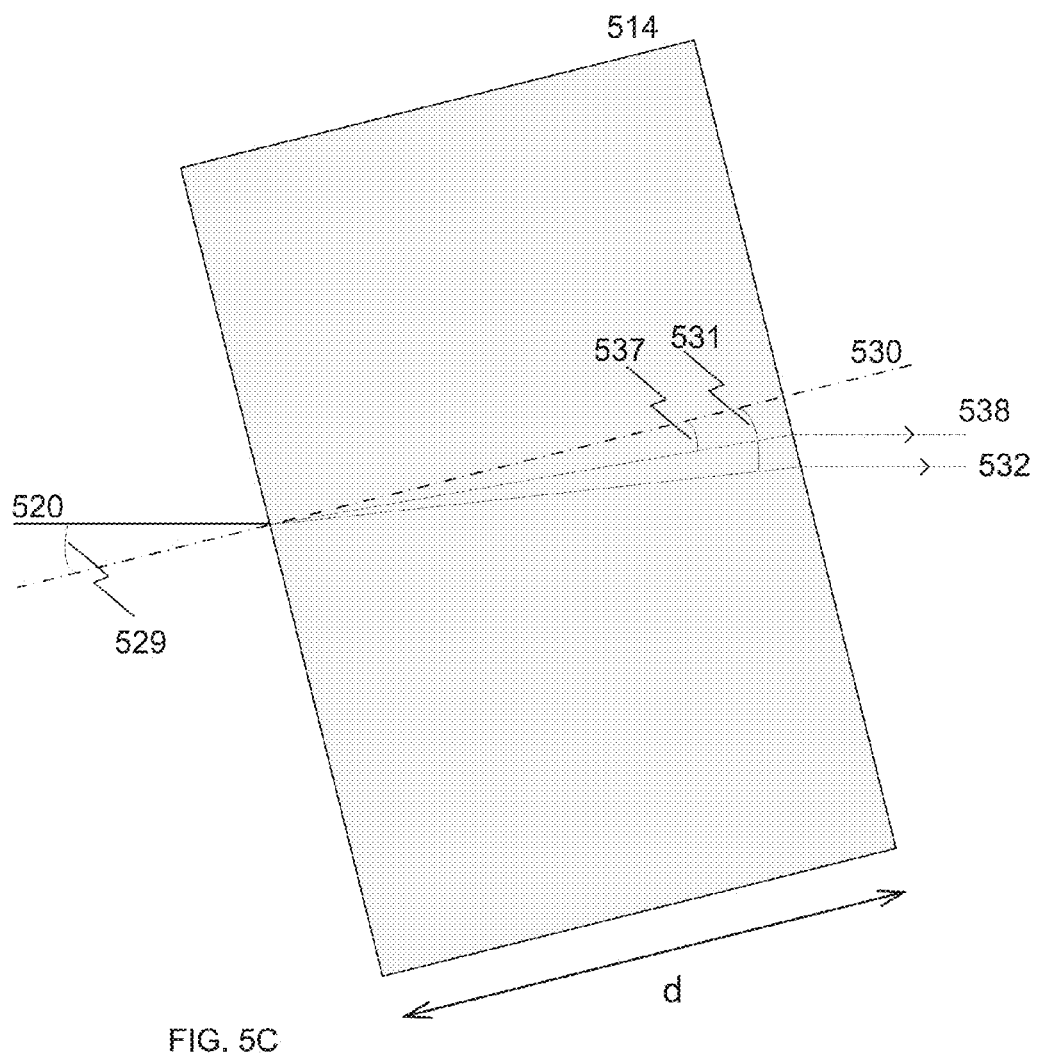

FIGS. 5B and 5C illustrate the effect of increasing the refractive index of the optical element 514 between the first and the second configuration. When increasing the refractive index of the material of the optical element, the angle 531, 537 between the normal 530 and the propagation vector of the light rays in the optical element decreases, such that the propagation vector in the second configuration is closer to the normal 530. This provides that the light rays 538 emerging from the optical element 514 and hence the pattern 535 at the object in the second configuration is offset relative to the light ray 532 and the pattern 524 in the first configuration.

FIG. 6 illustrates an embodiment where the optical element is rotated around the optical path, i.e. the change in the orientation of the optical element is a rotation around the optical path of the probe light.

Figure 6A:
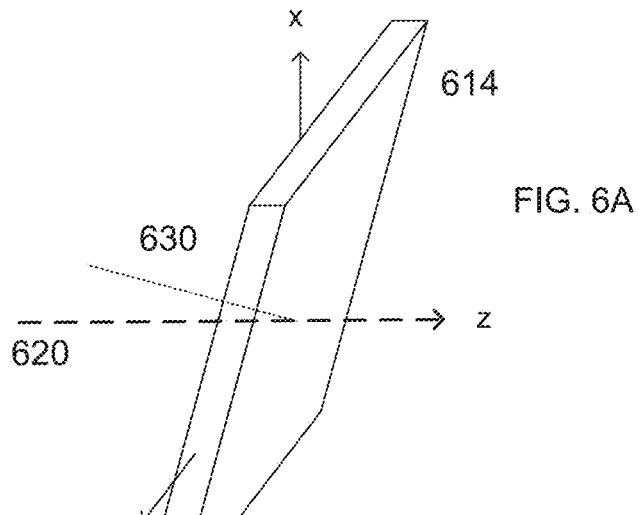
FIGS. 6A, 6B, and 6C illustrate an embodiment where the optical element is rotated around the optical path.
Figure 6B:
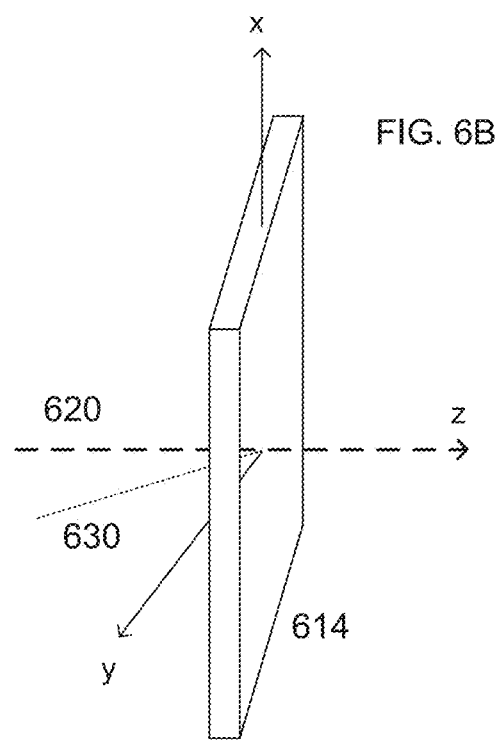

In FIGS. 6A and 6B, a Cartesian coordinate system is placed such that the z-axis is aligned with the propagation vector 620 of the light ray incident on the optical element 614, where the propagation vector defines the optical path at the optical element, i.e. the optical path just before the light rays impinge on the surface of the optical element. The optical element can e.g. be a glass plate consisting of silica glass.

In the configuration illustrated in FIG. 6A, the optical element is parallel with the y-axis and has an inclination relative to the x-axis. The normal 630 of the optical element is hence perpendicular to the y-axis and has an angle between 0 and 90 degrees (both end points being excluded) relative to the x-axis. Arranged as illustrated here, the optical element provides a shift in the position of the light ray which is negative along the x-axis.

Figure 6C:
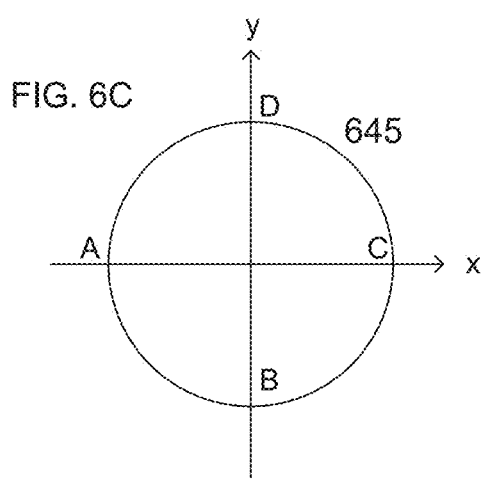
Figure 8A:
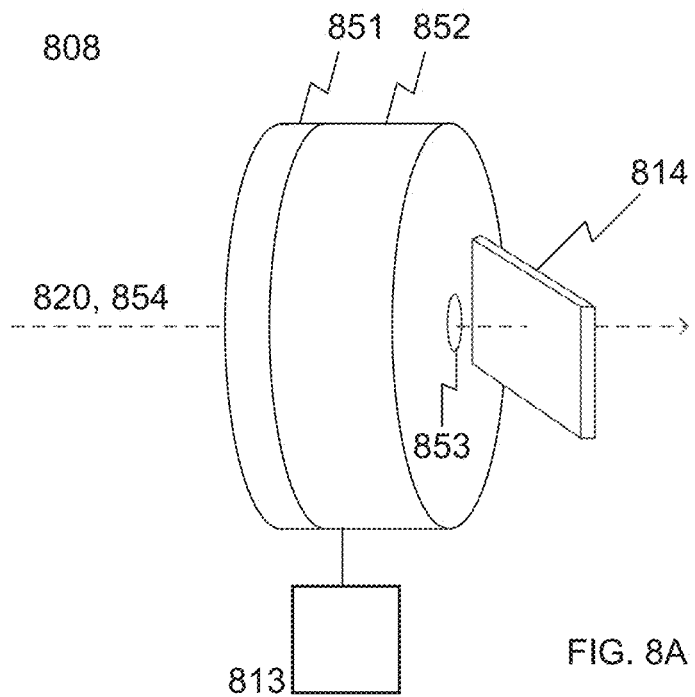
FIGS. 8A and 8B illustrate ways of controlling the orientation of the optical element relative to the optical path.

When rotating the optical element 90 degrees anti-clockwise around the z-axis (i.e. around the optical path at the optical element) the optical element becomes parallel to the x-axis while the normal 630 forms an angle with the y-axis having the same value as the angle between the normal 630 and the x-axis seen in FIG. 6A. The offset of the propagation vector of the light rays is now along the y-axis with a negative value equal in magnitude to the offset along the x-axis in FIG. 6A. The development of the offset when rotating the optical element 360 degrees around the optical path is illustrated in FIG. 6C where the perimeter of the circle 645 travels from point A (corresponding to the situation depicted in FIG. 6A) via points B (corresponding to the situation depicted in FIG. 6B), C and D to reach point A again when the 360 degrees is completed. When the optical system is capable of continuously changing the configuration, here determined by the rotation of the optical element 614 relative to the optical path 620 of the incident light ray, it is capable of providing a continuous shift in the position of the pattern on the illuminated object. Such a continuous change of the orientation of the optical element can e.g. be realized by arranging the glass plate 214 on a rotation unit as depicted in FIG. 8A such that the glass plate can be rotated around the optical path at the optical system.

One advantage of this design of the optical system is that the length which the probe light travels inside the optical element is the same for every configuration such that the offset is equal in size for all configurations.

In one case point A can be seen as the first configuration of the optical system while point C is regarded as the second configuration. The optical system is then capable of continuously changing between the first and the second configuration through the intermediate configurations on the upper part of the circle (including point D) or on the lower part of the circle (including point C).

FIG. 7 shows embodiments of the scanner with different positions of the optical system relative to a beam splitter used to project light returning from the object onto the image sensor.

Figure 7A:
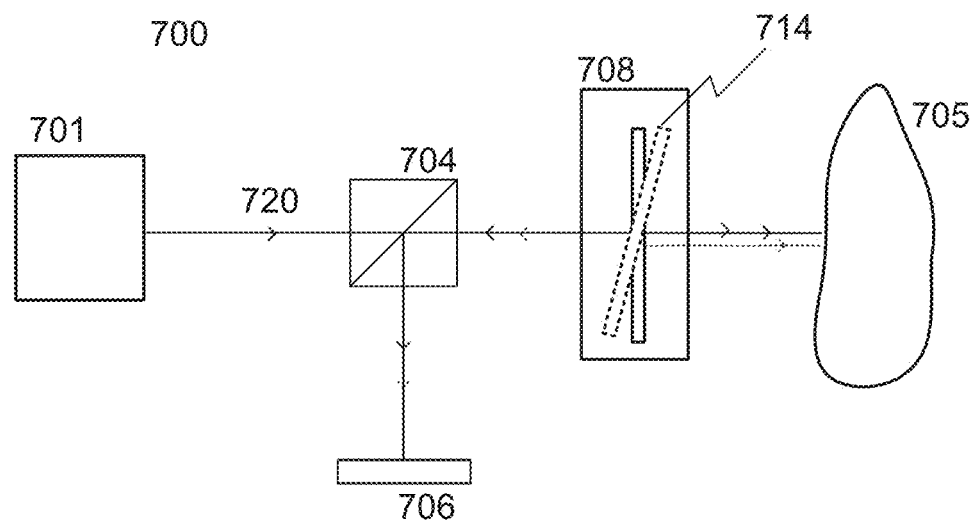
FIGS. 7A and 7B show embodiments of a 3D scanner.
Figure 7B:
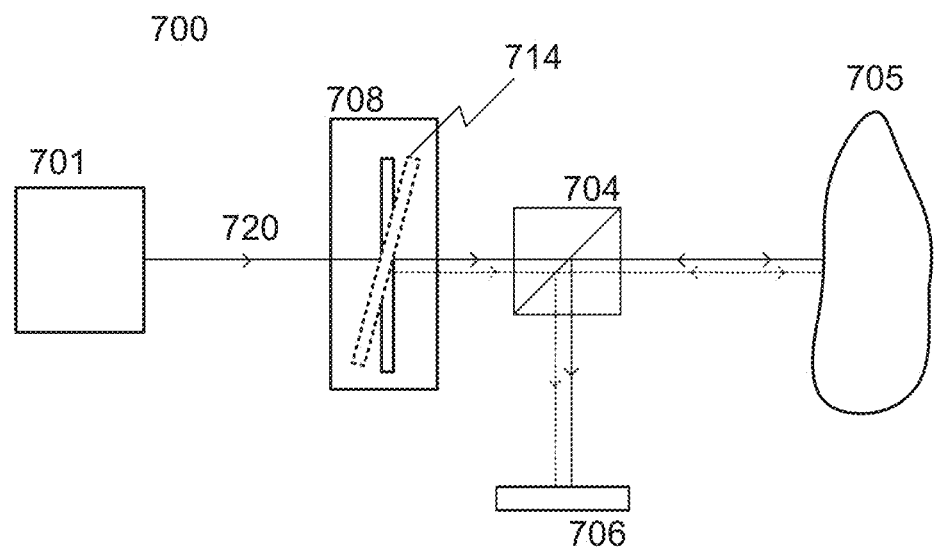

Both FIGS. 7A and 7B shows a schematic presentation of a scanner 700 according to the application with the illumination unit 701 emitting a patterned probe light 720 which is imaged onto the object 705 and a beam splitter 704 for projecting the returning light from the object onto the image sensor 706. The illumination unit 701 comprises a light source and a pattern generating mask for generating the intensity variations of the pattern. The difference between the figures being the position of the optical system 708 relative to the beam splitter 704.

In FIG. 7A, the beam splitter 704 is arranged between the optical element 714 and the illumination unit 701, such that optical element is arranged between the beam splitter 704 and the object 705 when scanning an object. The patterned probe light from the illumination unit 701 then propagates through the optical element 714 of the optical system 708 both when being projected onto the object and when returning from the object. With this design, a given section of the pattern of the probe light is imaged onto the same part of the image sensor 706 regardless of the configuration of the optical system, e.g. regardless of the orientation or refractive index of the optical element. According to the Helmholtz reciprocity of light rays, the light received from the object surface will follow the same path through the optical element 714 as is followed when propagating towards the object. A shift in the position of the pattern caused by the optical element when projecting the probe light onto the object is counteracted by the optical element on the return towards the image sensor 706. When an offset is applied (e.g. when having an orientation of the optical element in the second configuration which differs from that of the first configuration) the light from a section of the object surface corresponding to the offset pattern is imaged onto the same pixels in the image sensor as the light received in the first configuration. One section of pixels in the image sensor records light from a first portion of the object surface when the optical element is in its first configuration and light from a portion offset from the first portion when the optical element is in its second configuration. The change between the first and the second configuration of the optical system hence corresponds to moving the object relative to the scanner a distance which corresponds to the shift in the position of the patterned probe light.

In FIG. 7B, the optical system 708 is arranged before the beam splitter 704 such that the patterned probe light from the illumination unit 701 propagates through the optical element 714 of the optical system 708 only when being projected onto the object and not when returning from the object. The part of the light returning from the object 705 which is guided by the beam splitter 704 towards the image sensor 706 does not travel through the optical element 714. The pattern imaged onto the image sensor in the second configuration of the optical system 708 is offset from the pattern imaged onto the image sensor in the first configuration of the optical system. The effect of the change between the first and second configuration is hence to move the pattern relative to the image sensor, while the same part of the object is imaged onto the same pixels of the image sensor in both configurations of the optical system.

The optical system can be adjusted to provide a shift in the position of the patterned probe light which corresponds to half the period of the pattern when changing between the first and second configuration of the optical system. Changing the configuration while acquiring a 2D image such that the image sensor receives equal amounts of light from the first and second configuration smears out the pattern in the acquired 2D image. This is advantageous when recording the texture of the object since the pattern of the probe light otherwise may interfere with the texture and define the lower limit to the resolution of the texture recording. In a focus scanner configuration of a scanner according to the application, where a stack of 2D images for topography recording is acquired for each position of the scanner relative to the object, such a 2D image for texture recording can be acquired for each of the 2D images for the topography recording. The texture of the object can then be derived from the one set of 2D images and be projected onto a 3D sub-scan of the object topography derived from the other set of 2D images. One advantage of this approach is that the texture can be recorded with a resolution determined by the image sensor and not by the pattern of the probe light.

Having the optical system placed before the beam splitter can also be advantageous when the pattern of the probe light has a periodicity which is larger than the pixels of the image sensor such that each period of the pattern e.g. covers an area corresponding to 6×6 pixels on the image sensor. When the shift in the position of the pattern corresponds to half the period of the pattern on the image sensor, the combination of 2D images acquired with the optical system in the first and the second configuration can provide a texture image with a higher resolution than one 2D image alone.

FIG. 8 illustrates ways of controlling the orientation of the optical element relative to the optical path.

FIG. 8A shows an optical system 808 based on a motorized rotation stage having a first part 851 and a second part 852 where the optical element 814 is arranged on the second part and the motorized rotation stage is configured for rotating the second part 852 relative to the first part 851 around a rotation axis 854 of the rotation stage. The first part 851 can be firmly engaged with other parts of the scanner, such as fixated directly or indirectly to the casing and maintained in a constant position relative to the image sensor, such that the rotation of the second part is relative to the other parts of the scanner. The rotation axis 854 of the rotation stage and the optical path 820 at the optical element are aligned and the optical element 814 is arranged on the second part 852 of the motorized rotation stage in such a manner that when the second part 852 is rotated, the optical element 814 is rotated around the optical path 820 of the probe light. The optical element 814 is fixated on the rotating second part 852 of the rotation stage in such a manner that the propagation vector of the light rays 820 from the illumination unit is offset after the optical element in a direction determined by the orientation of the optical element relative to the propagation vector. When the rotating part second 852 part rotates around the optical path, the optical element is rotated around the optical path such that a shift in the position of the probe light pattern on the illuminated object is provided. The change in the orientation of the optical element hence comprises a rotation around the optical path of the probe light An opening 853 of the rotation stage allows light to pass through the rotation stage. The rotation of the second part 852 is controlled by the control unit 813 which thereby controls the change in configuration of the optical system between the first and the second configuration.

The process of scanning an object using the optical system 808 illustrated in FIG. 8A may comprise a sequence where one 2D image is acquired with the optical element arranged at one orientation relative to the optical path in step a), by the motorized rotation stage then changes the orientation by rotating its second part 852 an angle of 180° in step b), and a new 2D image is acquired in step c). A texture image can then be synthesized from the two 2D images and used for e.g. texture compensation when recording the 3D topography of the object.

One advantage of the system illustrated in FIG. 8A is that the probe light travels the same length in the material of the optical element. In focus scanner embodiments where this is not so, the change between different configurations of the optical system may results in a change of the focus plane position. With embodiments where the size of the angle of the optical element relative to the path of the probe light impinging on the element is constant for all configurations, such as the embodiment illustrated in FIG. 8A, the focus plane position is not affected by the change of configuration of the optical system.

Figure 8B:
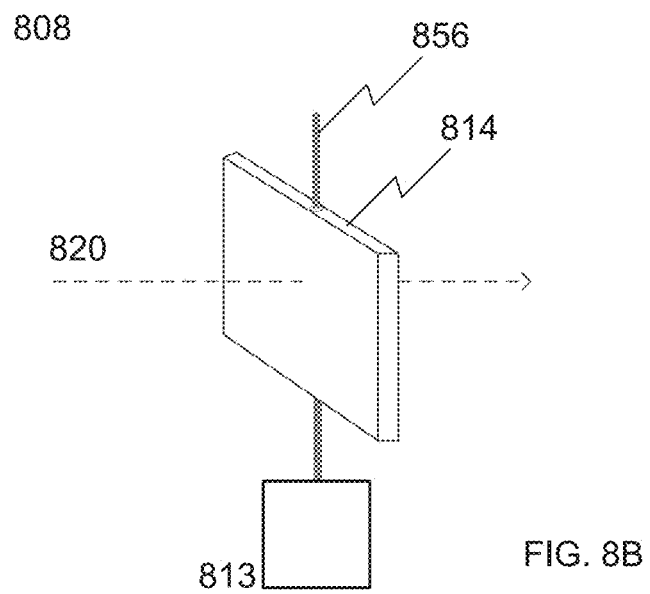

FIG. 8B shows an optical system 808 based on a motorized unit which is capable of changing the orientation of the optical element (here illustrated as a glass plate). The motorized unit comprises a shaft 856 on which the glass plate 814 is arranged and a control unit 813 connected to the shaft to control the rotation of the shaft and hence the rotation of the glass plate 814. The shaft and the glass plate are arranged such that the motorized unit is capable of rotating the optical element around an axis perpendicular to the optical path of the probe light at the optical element. With this design, the optical system 808 is capable of changing the angle between the normal of the glass plate 814 and the optical path 820 such that the configuration of the optical system can change between the first and the second configuration.

Both modes of the optical system has advantages over the prior art scanner illustrated in FIG. 1A since a single light source is sufficient to provide the shift in position of the probe light pattern on the illuminated object and that a continuous/gradual shift can be provided.

FIG. 9 shows steps of a method 960 of using a scanner according to the present application for recording the 3D topography of an object.

In step 962 a first set of 2D images of light returning from the object is acquired while illuminating the object with patterned probe light from the scanner with the optical system is in said first configuration such that the probe light pattern is located at one position on the object.

In step 963, a second set of 2D images of light returning from the object while illuminating the object with patterned probe light from the scanner with the optical system is in said second configuration where the second configuration is such that the position of the probe light pattern on the object is shifted compared to the position in step 962.

In step 964 the 3D topography of the object is derived based on at least the first or the second set of 2D images.

The deriving can comprise combining the individual 2D images in the first set with the corresponding 2D images in the second set and forming a sub-scan of the object based on the set of combined 2D images.

The deriving can comprise combining the 2D images in the first set to form a first sub-scan of the object and combining the 2D images in the second set to form a second sub-scan before combining with first and second sub-scans to provide a combined sub-scan.

Steps 962 and 963 may be performed substantially in parallel such that a 2D image for each set/configuration is acquired e.g. for the same position of a focus plane. The focus plane is then moved and the next 2D image for each set/configuration is acquired.

Figure 10:
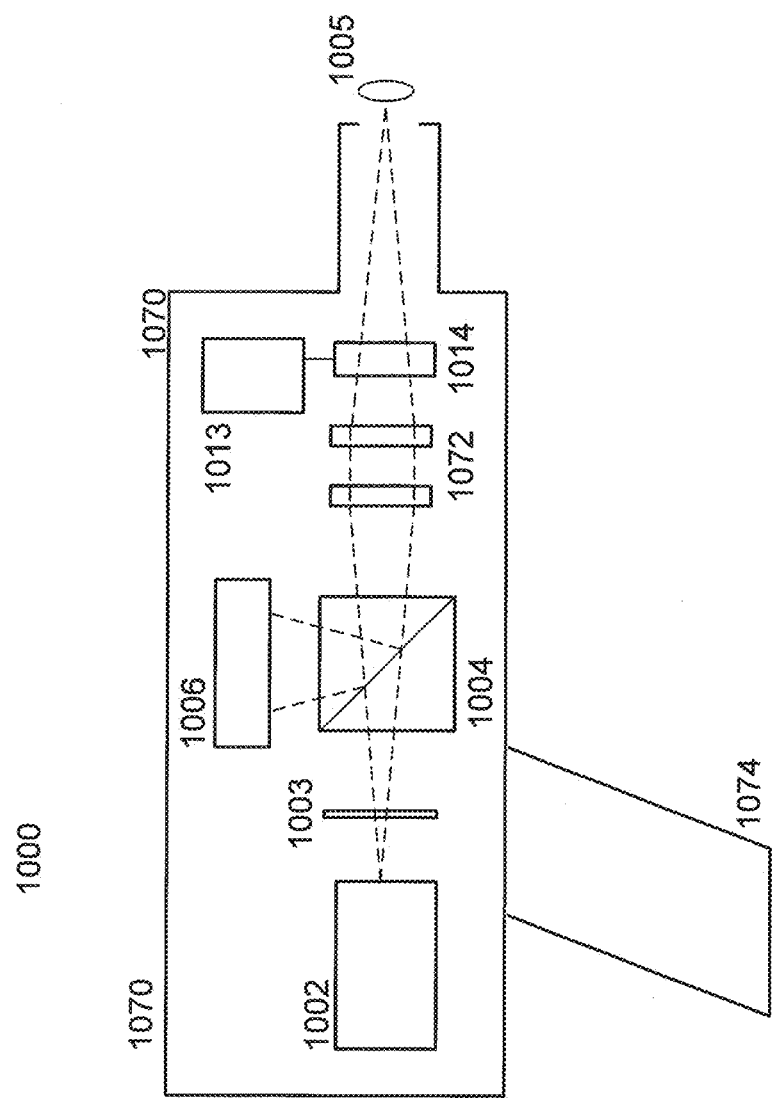
FIG. 10 shows a handheld scanner.

FIG. 10 shows a handheld scanner according to the application.

The illustrated scanner 1000 is suited for handheld operation and can e.g. be used for intraoral scanning where the 3D topography of the patient's teeth and parts of the surrounding issue are recorded.

Several components of the scanner are arranged inside a main body 1070, such as the illumination unit with light source 1002 and pattern generation means 1003 for incorporating a spatial pattern in the probe light, a beam splitter 1004, and an image sensor 1006. A control unit 1013 is provided for controlling the configuration of the optical system, e.g. by changing the orientation of the optical element 1014. If the handheld scanner operates by the focus scanning technique, the scanner also comprises a lens assembly 1072 used e.g. for controlling the position of a narrow depth-of-field focus plane on the object 1005. The probe light from the light source 1001 travels to the object 1005 from where some light is reflected and propagates back thought the optical system to the image sensor 1006. During this passage the optical system images the pattern 1003 onto the object 1005 being scanned and further images the object being scanned onto the image sensor 1006.

The main body 1070 has a handle 1074 allowing the user to hold the scanner 1000 in a comfortable manner that also allows good control over the scanner.

The lens assembly 1072 can include a focusing element which can be adjusted to shift the focal plane of the pattern on the scanned object 1005. For example, a single lens element can be shifted physically back and forth along the optical path of the scanner.

The scanner may include polarization optics, which can be used to selectively image specular reflections and block out undesired diffuse signal from sub-surface scattering inside the scanned object. The beam splitter 1004 may also have polarization filtering properties. It can be advantageous for optical elements to be anti-reflection coated.

Other parts of the scanner integrated in the main body 1070 can be optical elements for guiding light to the image sensor 1006, processing electronics, a control unit configured for controlling the acquisition of 2D images, an outer shell, amongst others.

For some applications it is advantageous that the scanner comprises a tip which is to be arranged at the main body of the scanner where the tip is configured for approaching the object to be scanned. This can be the case when hygiene issues are important and a cleaning of the tip is desired such as between using the scanner on different patients. For intraoral scanning where the 3D topography of a patient's teeth is to be recorded, the tip can be an elongated structure such that it can enter a patient's oral cavity.

FIG. 11 shows a rotation around the optical path expressed in cylindrical coordinates.

The rotation of the optical element can be described in a cylindrical coordinate system with the longitudinal axis aligned with the optical path at the surface of the optical element facing the illumination unit as illustrated in FIG. 11. In FIG. 11A is illustrated an optical element 1114 (here in the form of a slide shaped plate) with a surface 1181 facing the illumination unit such that the optical path 1120 intersects the surface 1181. The optical element 1141 is arranged such that there is an acute angle cc between the optical path 1120 and the surface 1181. A point 1182 on the surface is indicated by a black dot. The same point is indicated in FIG. 11B where the optical element is seen along the optical path 1120. The cross 1183 marks the place where the optical path intersects the surface 1181. For a constant acute angle $\alpha$ between the surface 1181 of the optical element 1114 and the optical path 1120 there will exist points 1182 on the optical element surface 1181 which each has a constant radial distance, $\rho_\alpha$, to the longitudinal axis and a constant longitudinal coordinate, $z_\alpha$, during a rotation of the optical element around the optical path while the angular coordinate, $\phi$, varies with the rotation. The radial distance for these points depends on the acute angle $\alpha$ and the position on the surface of the optical element. FIG. 11C illustrates the movement of the point 1182 of FIG. 11A during a 180° rotation around the optical path. The longitudinal axis L of cylindrical coordinate system is aligned with the optical path 1120, the origin O is located at the cross on the surface 1181 of the optical element indicated in FIG. 11B. The polar axis, A, of the cylindrical coordinate system is also seen. During a rotation around the optical path, the point follows a circular curve 1187. The initial point $(\rho_\alpha, \phi_1, z_\alpha)$ corresponds to the arrangement of the optical element illustrated in FIG. 11A. After a rotation of 90° the point has moved to coordinates $(\rho_\alpha, \phi_2, z_\alpha)$ and after a further rotation of 90° the point has moved to coordinates $(\rho_\alpha, \phi_3, z_\alpha)$. The rotation can continue and after a full 360° rotation the point is back at $(\rho_\alpha, \phi_1, z_\alpha)$.

If the acute angle changes during the rotation, the point no longer follows a circle. The acute angle can be changed such that it is periodic with a period of 180° whereby the point can define an ellipse instead of the circle defined with a constant acute angle.

The invention claimed is:

1. A 3D scanner for recording the 3D topography of an object, the 3D scanner comprising:
    an illumination unit configured for providing probe light for illuminating the object, where the probe light comprises a pattern of light rays;
    an image sensor for acquiring one or more 2D images of light rays returning from the illuminated object;
    an optical system comprising an optical element arranged such that the patterned probe light passes through the optical element when propagating towards the object from the illumination unit along an optical path; and
    a device for changing the configuration of the optical system between a first and a second configuration, where the change in configuration comprises a change in orientation of the optical element between a first orientation and a second orientation relative to the optical path of the probe light such that the change of configuration provides a shift in the position of the probe light pattern on the illuminated object.

2. The 3D scanner according to claim 1, wherein the change in the orientation of the optical element comprises a rotation around the optical path of the probe light at the optical element.

3. The scanner according to claim 1, wherein the change in orientation of the optical element comprises a rotation around an axis perpendicular to the optical path of the probe light at the optical element.

4. The 3D scanner according to claim 1, wherein the optical element comprises a plate.

5. The 3D scanner according to claim 4, wherein the plate is an AR coated glass plate.

6. The 3D scanner according to claim 1, wherein the device for changing the configuration of the optical system is capable of gradually changing the configuration between the first and the second configuration through a number of intermediate configurations.

7. The 3D scanner according to claim 1, wherein the device comprises a motorized rotation stage comprising a first part and a second part, where the optical element is arranged on the second part and the motorized rotation stage is configured for rotating the second part relative to the first part around a rotation axis of the rotation stage.

8. The 3D scanner according to claim 7, wherein the optical element is arranged on the second part of the motorized rotation stage in such a manner that when the second part is rotated the optical element is rotated around the optical path of the probe light.

9. The 3D scanner according to claim 7, wherein the rotation axis of the rotation stage and the optical path at the optical element are substantially parallel.

10. The 3D scanner according to claim 1, wherein the 3D scanner comprises a beam splitter arranged such that it directs the light rays returning from the object towards the image sensor.

11. The 3D scanner according to claim 10 wherein the optical element is arranged between the illumination unit and the beam splitter.

12. The 3D scanner according to claim 10, wherein the beam splitter is arranged between the optical element and the illumination unit.

13. The 3D scanner according to claim 1, wherein the pattern is periodic at least along one direction in a plane substantially transverse to the optical path.

14. The 3D scanner according to claim 1, wherein the ratio between the shift in the position of the patterned probe light on the object when changing between the first and second configuration and the periodicity of the pattern is ½.

15. The 3D scanner according to claim 1, wherein the 3D scanner changes the configuration of the optical system between the acquisition of two subsequently acquired 2D images.

16. The 3D scanner according to claim 1, wherein the 3D scanner changes the configuration of the optical system between the first and second configuration during the acquisition of a 2D image.

17. The 3D scanner according to claim 1, wherein the change in the orientation of the optical element comprises a rotation, wherein the axis of the rotation is aligned with the optical path of the probe light at the optical element.

18. The 3D scanner according to claim 1, wherein the change in the orientation of the optical element comprises a rotation, wherein the axis of the rotation is parallel with the optical path of the probe light at the optical element.

* * * * *